(12) United States Patent
Eger et al.

(10) Patent No.: US 7,365,470 B1
(45) Date of Patent: Apr. 29, 2008

(54) BRUSH HOLDER ASSEMBLIES INCLUDING BRUSH HOLDERS WITH HANDLES

(75) Inventors: Leo A. Eger, Murrysville, PA (US); John Parslow, Scotia, NY (US)

(73) Assignee: Fulmer Company, Export, PA (US)

( * ) Notice: Subject to any disclaimer, the term of this patent is extended or adjusted under 35 U.S.C. 154(b) by 369 days.

(21) Appl. No.: 11/096,990

(22) Filed: Apr. 1, 2005

(51) Int. Cl.
*H01R 39/38* (2006.01)
*H02K 13/00* (2006.01)

(52) U.S. Cl. ................ 310/240; 310/239; 310/242

(58) Field of Classification Search ............. 310/229, 310/239, 240, 242, 246, 245; 29/732
See application file for complete search history.

(56) References Cited

U.S. PATENT DOCUMENTS

| | | | |
|---|---|---|---|
| 3,432,708 A * | 3/1969 | Bissett | 310/239 |
| 3,710,478 A * | 1/1973 | Krulls et al. | 29/732 |
| 3,864,803 A * | 2/1975 | Ohmstedt et al. | 29/732 |
| 4,800,313 A | 1/1989 | Warner et al. | 310/242 |
| 7,034,430 B2 | 4/2006 | Custforth et al. | 310/229 |

* cited by examiner

*Primary Examiner*—Karl I Tamai
(74) *Attorney, Agent, or Firm*—Dean W. Russell; Kilpatrick Stockton LLP

(57) ABSTRACT

Brush holder assemblies are detailed. The assemblies permit on-line brush replacement and are interchangeable with devices currently provided by original equipment manufacturers. As well, they allow use of brushes longer than those employed in existing on-line replacement assemblies.

4 Claims, 6 Drawing Sheets

BRUSH HOLDER ASSEMBLIES INCLUDING BRUSH HOLDERS WITH HANDLES

FIELD OF THE INVENTION

This invention relates to brush holders and associated equipment and more particularly, but not exclusively, to brush holder assemblies compatible with existing riggings and which allow safer and easier on-line changes of brushes. The assemblies additionally may permit use of longer brushes than current commercially-available assemblies, increasing the time between brush changes.

BACKGROUND OF THE INVENTION

U.S. Pat. No. 4,800,313 to Warner, et al., whose contents are incorporated herein in their entirety by this reference, details examples of brush holders for use with carbon brushes. These holders utilize ribbon springs so as to provide essentially constant biasing force to the brushes. They are, in at least this aspect, conventional, as the use of constant biasing force is known generally to reduce maintenance, prevent performance problems, and increase the useful lives of the brushes.

Commutators or slip rings and associated carbon brushes and holders are used in numerous industrial contexts. Some such uses are for power generation. Collector brush riggings provided by original equipment manufacturers (OEMs) typically accept certain brush-holder designs, many of which are not designed to allow easy brush replacement while equipment is operating. Consequently, when a brush is worn such that its useful life has expired, the corresponding power-generation equipment must cease operation before the brush may be replaced safely. In practice, however, some equipment operators replace brushes without ceasing operation of the equipment, conduct carrying a high risk of injury.

Efforts have been made to supply improved brush holders which permit on-line replacement of brushes. Currently-available holders of this type are expensive and cumbersome, however, or may require extensive or expensive modifications to the associated equipment (such as the brush holder support system). In many cases, the replacement brush holders accept brushes significantly shorter than the original-equipment brushes and are not interchangeable with existing OEM devices.

SUMMARY OF THE INVENTION

The present invention resolves issues associated with these types of brush holders. Assemblies of the invention both permit safer and easier on-line brush replacement and are interchangeable with existing original-equipment devices. As well, they allow use of brushes with length equal to or, in most cases, longer than currently-available replacement brush holder assemblies, with preferred assemblies of the invention accepting brushes approximately four inches long. The brush holders also may be configured to accept original OEM brushes or brushes with improved terminations.

The invention additionally may provide extra support to brushes, diminishing adverse effects of vibration on their wear. It is substantially less cumbersome than prior efforts and significantly less costly to produce. Handles forming part of the assemblies also are removable for reuse, so that only one handle is necessary regardless of the number of assemblies employed.

It thus is an optional, non-exclusive object of the present invention to provide innovative brush holder assemblies.

It is also an optional, non-exclusive object of the present invention to provide brush holder assemblies permitting safer and easier on-line replacement of brushes.

It is an additional optional, non-exclusive object of the present invention to provide brush holder assemblies that are interchangeable with ones provided by OEMs.

It is another optional, non-exclusive object of the present invention to provide brush holder assemblies adapted to accept brushes equal in length to or longer than corresponding conventional assemblies and which can be configured to be interchangeable with original-equipment brushes.

It is a further optional, non-exclusive object of the present invention to provide brush holder assemblies capable of supplying enhanced vibrational support for brushes, reducing adverse effects of vibrations on their usefulness.

Other objects, features, and advantages of the present invention will be apparent with reference to the remaining text and the drawings of this application.

DETAILED DESCRIPTION

Figure 2:
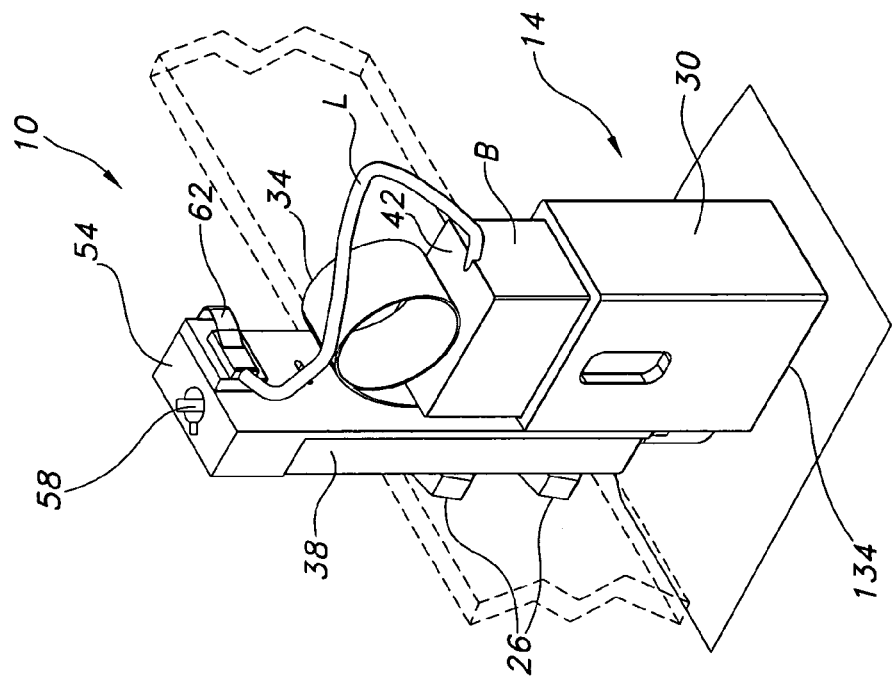
FIG. 2 is a perspective view of the assembly of FIG. 1 with the handle removed.
Figure 1:
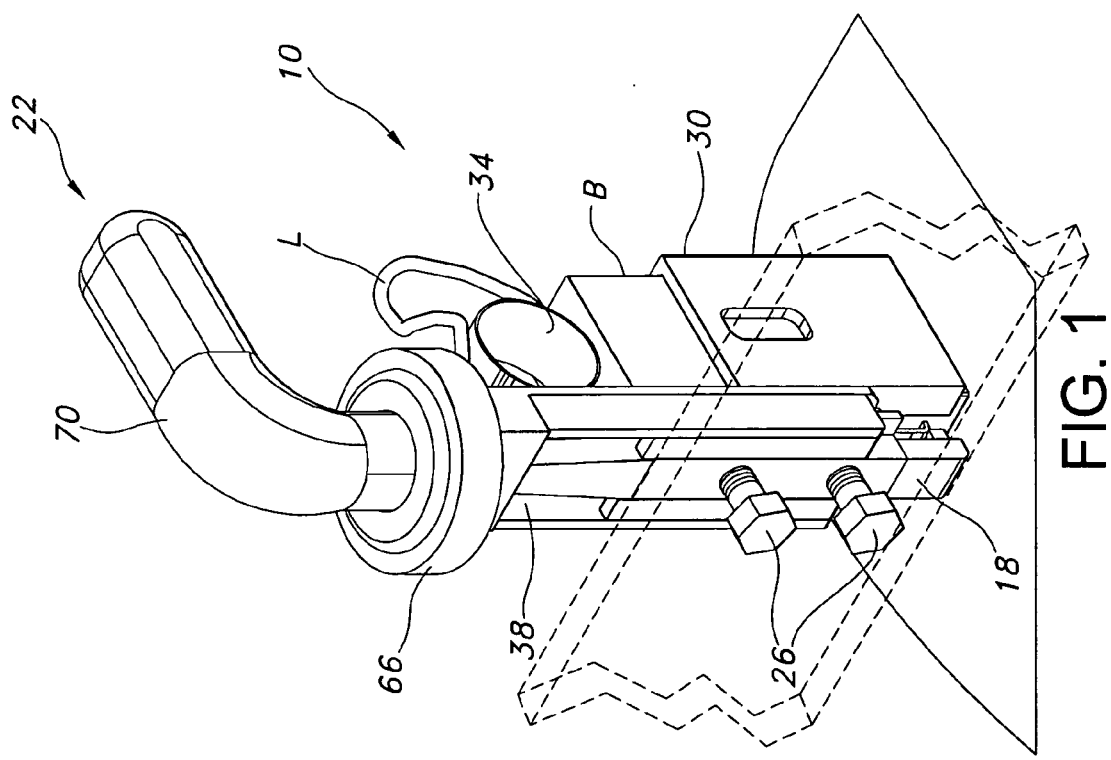
FIG. 1 is a perspective view of an exemplary brush holder assembly of the present invention with a handle attached.

Detailed in FIGS. 1-4 is brush holder assembly 10 of the present invention. Assembly 10 comprises brush holder 14 and support 18. At times, it additionally may comprise handle 22 and one or more fasteners such as bolts 26. In use, assembly 10 is configured to receive and retain brush B while biasing the brush B toward a surface of a rotating device such as a commutator or slip ring.

Included as part of holder 14 are brush box 30, spring 34, and back plate or section 38. Box 30 is designed to receive at least a portion of brush B and to support and restrain some movement of the brush B during operation. It preferably is integrally formed with section 38, although it need not necessarily be so formed. Instead, for example, box 30 may be a separate component fastened or otherwise connected to section 38. Holder 14 additionally may be configured to accommodate various forms and dimensions of boxes presently in use in OEM holders.

Spring 34, as shown in FIGS. 1-4, may be a ribbon spring or other biasing means attached to either or both of box 30 or section 38. When brush B is retained within assembly 10, spring 34 contacts (nominally) top surface 42 and biases (nominally) bottom surface 46 of brush B toward a rotating device. As brush B wears, spring 34 tends to roll up, always supplying substantially constant bias force to the brush B.

FIGS. 1-4 illustrate section 38 as of generally rectangular, elongated shape. Although it may be shaped in any suitable way, section 38 preferably includes groove 50 into which support 18 may be fitted. Section 38 additionally may include (nominally) top surface 54 with bore 58 formed therein as well as electrical connector 62. Although shown as a quick-connect type terminal, connector 62 may be a terminal screw or any other suitable mechanism for providing an electrical connection to lead L of brush B.

Bore 58 preferably has the complex shape shown especially in FIG. 2. Bore 58 receives handle 22 during removal and replacement of brush B. Unlike certain other holders, however, handle 22 is not necessarily permanently received by bore 58. Instead, handle 22 may be removable therefrom when brush holder 14 is installed onto support 18. Since handle 22 is suitably insulated with adequate distance between its grip 70 (see FIG. 4) and adjacent equipment, handle 22 may be removed while the equipment is energized or rotating. This allows handle 22 to be used to replace brushes in other assemblies on the rigging and permits its insulation to remain clean, as it may be stored away from the rigging environment when not in use.

Figure 3:
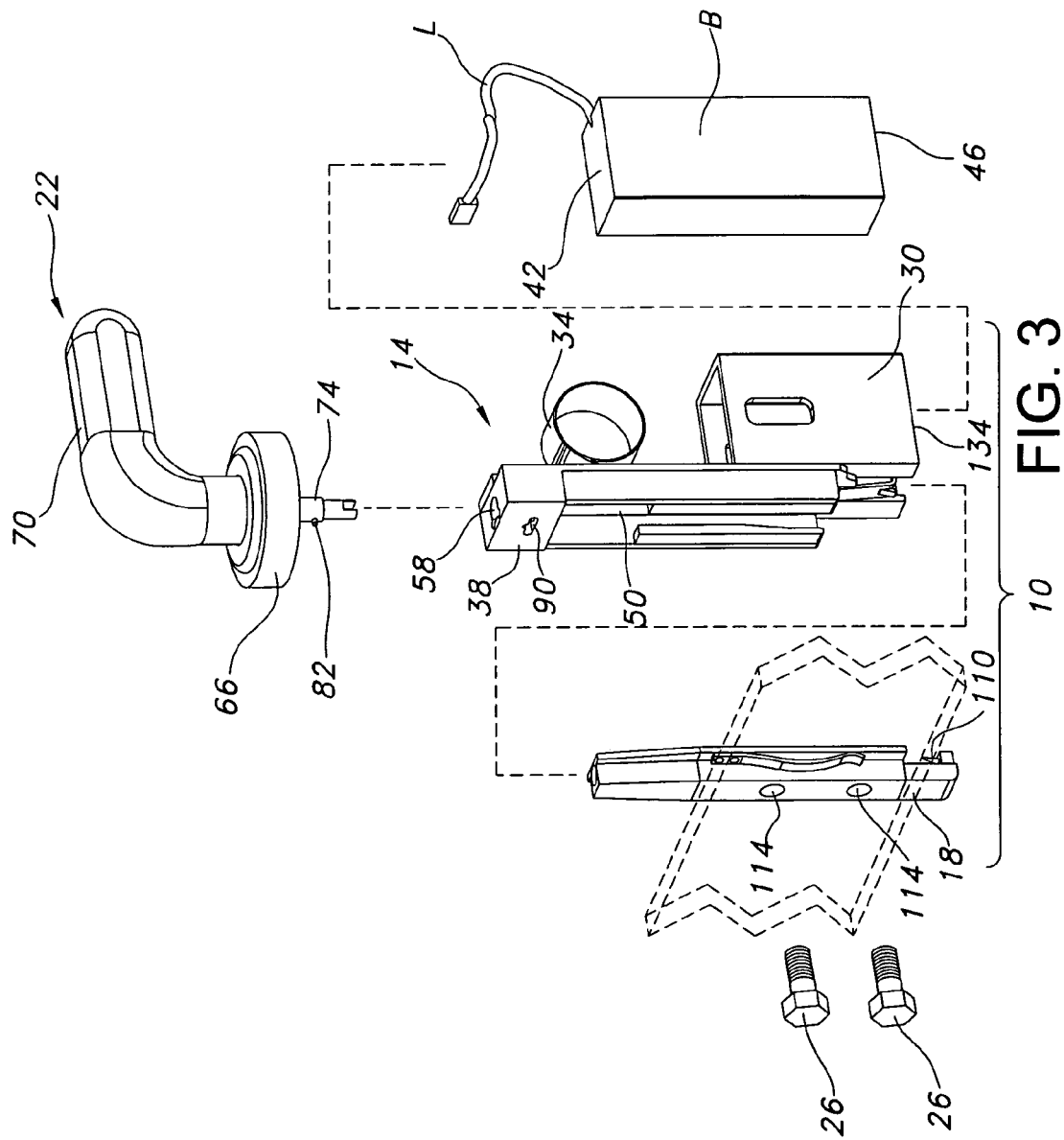
FIG. 3 is an exploded view of the assembly of FIG. 1.
Figure 4:
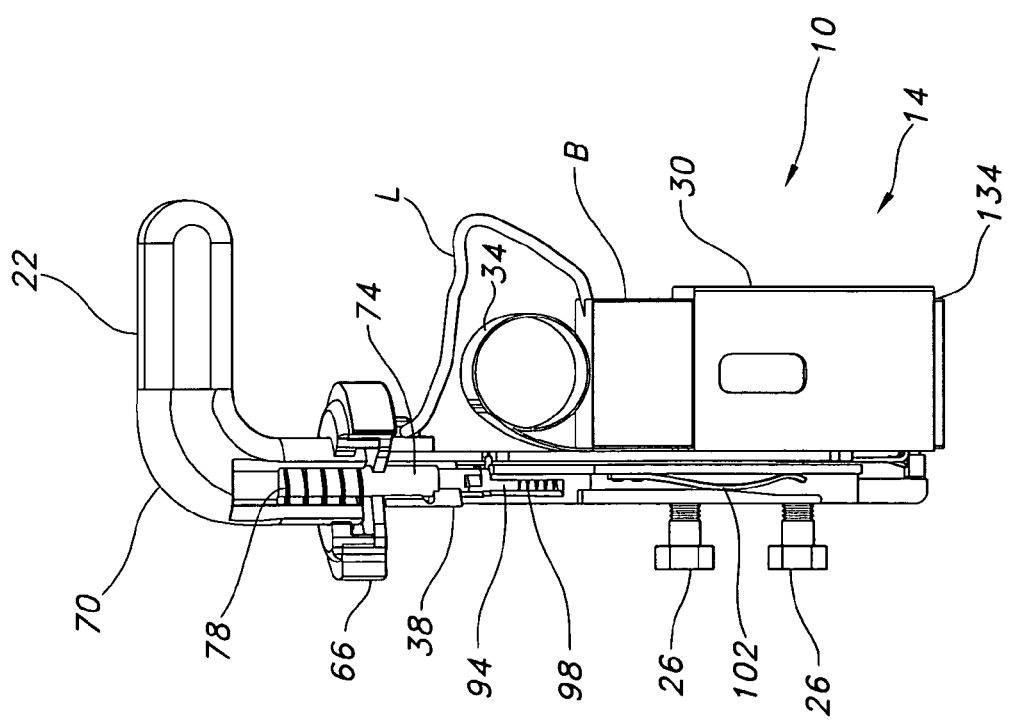
FIG. 4 is a partial cut-away view of the assembly of FIG. 1.

As best illustrated in FIGS. 3-4, handle 22 may comprise guard or base 66, grip 70, shaft 74, and coil spring 78. Both base 66 and grip 70 are electrically insulated on their outer surfaces, and grip 70 is fastened to shaft 74 so they rotate together. When handle 22 is in use, base 66 abuts top surface 54 of brush holder 14 and grip 70 is configured to be grasped, pushed, and turned by an operator. Shaft 74, which may include pin 82, is designed to fit into bore 58, with the pin 82 engaging slot 86 (see FIG. 5) of the bore 58. Those skilled in the art will recognize that other methods of connecting handle 22 and brush holder 14 may be used instead, however, if appropriate or desired.

Figure 5:
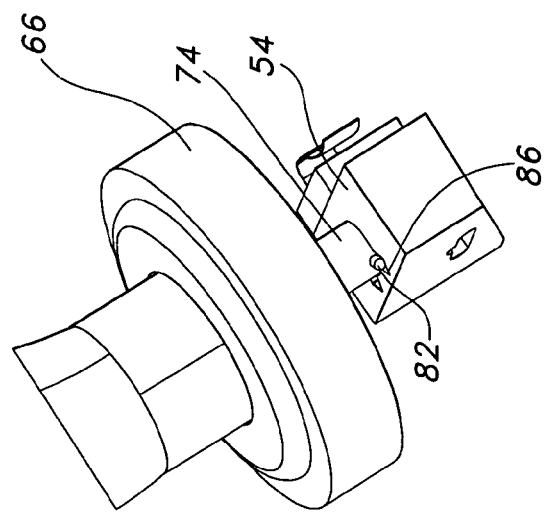
FIGS. 5-6 are close-up views of portions of the assembly of FIG. 1 illustrating attachment of the handle.
Figure 6:
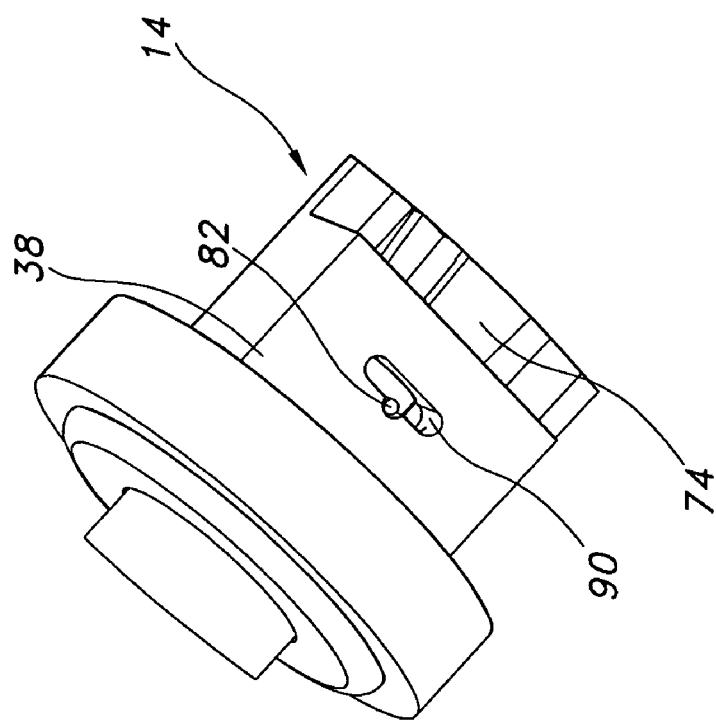

FIGS. 5-6 detail initial insertion and locking of handle 22 into brush holder 14. As shown in FIG. 5, shaft 74 of handle 22 may be inserted into bore 58 so that pin 82 is aligned with slot 86. Slot 86 communicates with second slot 90 of brush holder 14, which is oriented generally perpendicular thereto. Because slot 86 communicates with second slot 90, as shaft 74 is inserted further into bore 58, pin 82 may travel down slot 86 until it reaches second slot 90.

Once pin 82 reaches second slot 90, an operator may start to turn handle 22 and then cease pushing down on the handle 22 while continuing to turn (rotate) it. This rotation moves pin 82 into second slot 90 (preferably toward the center position thereof). The operator may continue turning handle 22 until pin 82 snaps into this center position (into the center lobe of slot 90; see FIG. 6). This action effectively locks handle 22 to brush holder 14.

Support 18 preferably comprises an elongated, generally rectangular structure with T-shaped cross-section, such as that shown especially in FIG. 3. T-slot shaped groove 50 of brush holder 14 may be fitted onto support 18 so that support 18 fits within T-slot groove 50. Contact spring 102 biases a surface of brush B or brush holder 14 against support 18, thereby both precisely positioning the brush holder 14 and providing consistent electrical contact between brush holder 14 and support 18. Brush holder 14 also may be removed from support 18 when appropriate.

Figure 7:
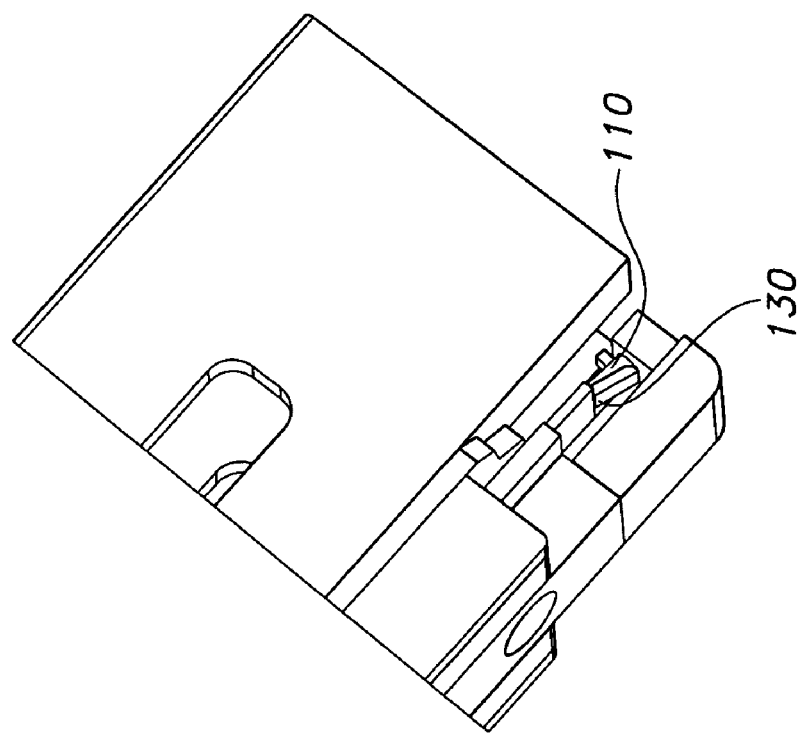
FIG. 7 is a close-up view of portions of the assembly of FIG. 1 illustrating interaction of features of a brush holder and a support.
Figure 8:
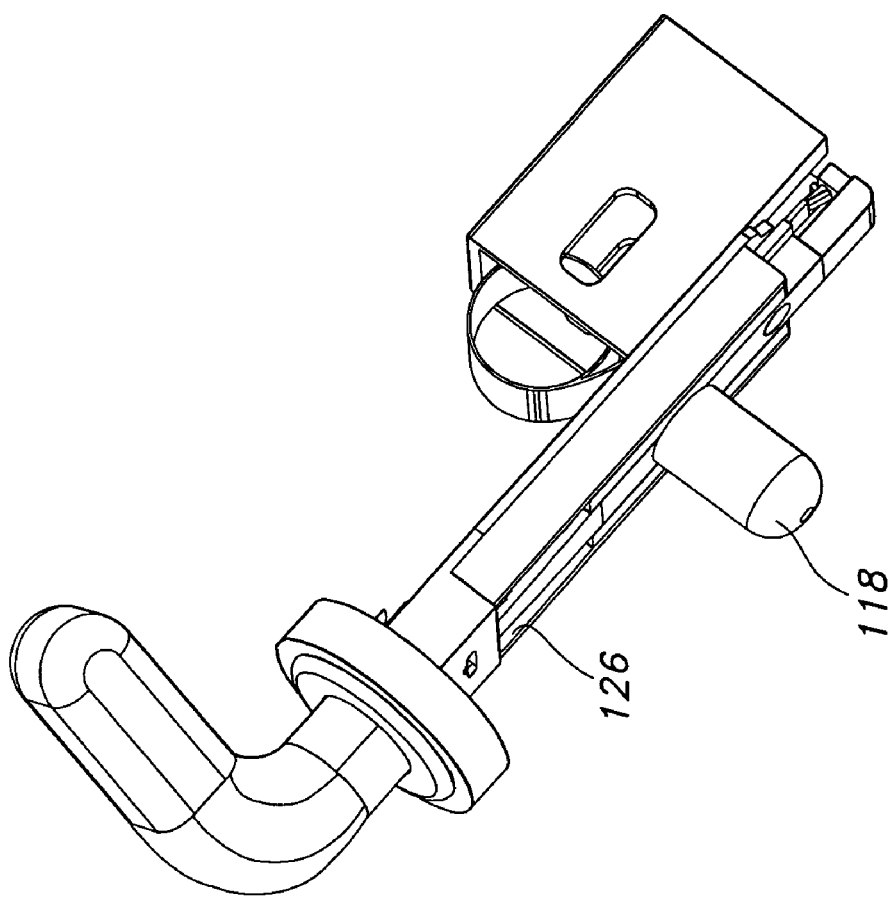
FIG. 8 is a perspective view of the assembly of FIG. 1 with the support being used to facilitate insertion of a brush.

Included within or as part of support 18 are bushing 94, return spring 98, and contact spring 102 (see FIG. 4). Also included as part of support 18 may be pin 110 (FIG. 7) together with one or more bores 114 (see FIG. 3). Depending on the function of support 18, a bore 114 may receive either a bolt 26 (or other fastener) or a brush-changing handle 118 (FIG. 8). Pin 110 may move brush retainer 130 of brush holder 14 away from a surface of brush B immediately before holder 14 is fully seated onto support 18. Release of retainer 130 (which preferably is a spring) allows brush B to move freely in brush box 30, which is essential for proper brush operation. Before retainer 130 is moved off the surface of brush B, brush holder 14 securely holds brush B against unwanted movement during installation or removal.

To install a new or replacement brush B, an operator may use changing handle 118 attached to support 18 (thereby converting these parts to a brush-changing fixture). This configuration need not be as shown in FIG. 8, however. Instead, it may comprise any lever or other object able to facilitate lifting of retainer 130 when the object is inserted into brush holder 14 to facilitate installation of a new brush.

This brush-changing fixture may be slid into groove 50 of holder 14. Typically, the brush-changing fixture will be placed on a flat surface and brush holder 14 slid down over the fixture along its length until they are seated together. This approach is not mandatory, however; instead, for example, the brush-changing fixture may simply be slid upward into T-slot groove 50 of holder 14 until they are seated together.

Figure 9:
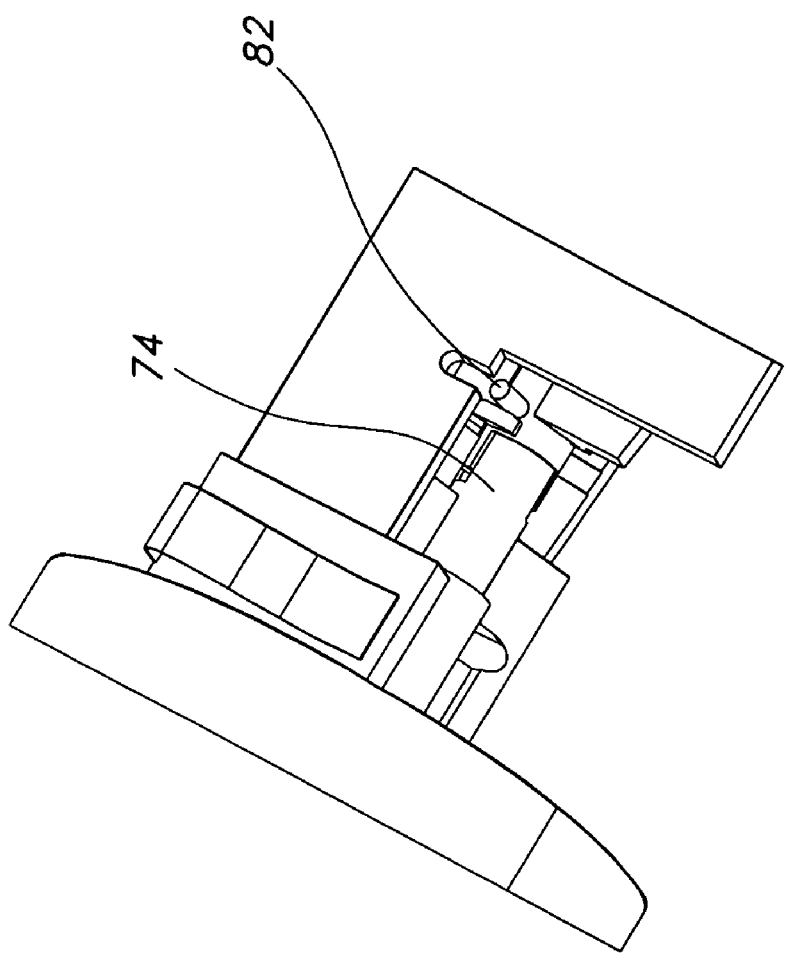
FIG. 9 is a close-up, cut-away view of aspects of the brush holder and support.

After fully inserting support 18 into holder 14, an operator may rotate handle 22 again so as to lock support 18 to holder 14. Suitably rotating handle 22 causes shaft 74 to engage and rotate bushing 94 and pin 82 to be positioned as shown in FIG. 9, effectively locking support 18 and holder 14 together. As well, full insertion of support 18 into holder 14 causes pin 110 to lift brush retainer 130 (see FIG. 7), permitting insertion of brush B into box 30 of holder 14.

Once support 18 and holder 14 are locked together, brush B may be inserted through end 134 of box 30. Usually (although again not necessarily), bottom surface 46 of brush B is placed on a flat surface and box 30 slid over brush B. This action causes spring 34 to contact top surface 42 of brush B and to begin to unroll. When brush B is adequately inserted into box 30 (i.e. when bottom surface 46 is approximately flush with end 134 of box 30), handle 22 may be rotated so as to unlock support 18 from holder 14. Changing handle 118 may then be grasped and support 18 removed from holder 14, which disengages pin 110 from brush retainer 130. Disengagement of pin 110 allows brush retainer 130 to move toward its normal (relaxed) position; however, an edge of retainer 130 contacts brush B before retainer 130 reaches its relaxed position, thereby causing retainer 130 to be biased against brush B to restrain unwanted brush movement. Lead L of brush B then may be connected to connector 62.

All of these above-described activities may occur away from any rotating or energized device. After installation of brush B into brush holder 14, holder 14 may be re-installed on support 18 which is mounted on the equipment, reseating the T-slot groove 50 onto the T-section of the equipment support 18. After this seating, handle 22 may be turned again to lock brush holder 14 to support 18 and then may be removed for use elsewhere or for storage. Bolts 26 may be used to fasten support 18 to the equipment rigging; however, this is done only during initial installation of the support 18 and need not occur during normal operation, normal brush changing, or maintenance of brushes.

Because assembly 10 permits replacement of brush B away from a rotating or energized device, the device need not be de-energized while replacement occurs. (As noted earlier, this is because the brush holder is removed from the rotating or energized device using an insulated handle 22, then specific operations to replace the brush B are completed away from device.) Further, because preferred versions of assembly 10 are sized similarly to existing brush holders, they may readily be interchanged with such existing holders. Accordingly, retrofit of existing power-generation or other systems may occur with little or no modification to the brush holder support systems. Assembly 10 also is cost-effective to produce (and thus lowers initial cost to the purchaser) and to operate and maintain and is configured to accept longer brushes B than are generally employed with current replacement offerings. Indeed, assembly 10 as configured can permit further growth in the length of section 38 along with a longer spring 34 to allow an even longer brush B with accompanying longer brush life and reduced maintenance of collector systems. Assembly 10 can also provide enhanced vibrational and other support for longer brushes B, since the brush box 30 is longer than in most conventional holders.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. A brush holder assembly comprising:
   a. a removable handle comprising a shaft:
   b. a brush holder comprising:
      i. means for biasing a brush toward a rotating device;
      ii. means for removably receiving the handle to facilitate replacement of the brush; and
      iii. a bore into which the shaft is fitted;
   c. a support comprising:
      i. at least a portion with T-shaped cross-section to which the brush holder is removably attached;
      ii. a contact spring configured to bias a surface of the brush holder against the support; and
      iii. a bushing configured to be engaged and rotated by the shaft.

2. A brush holder assembly comprising:
   a. a brush holder comprising:
      i. means for biasing a brush toward a rotating device; and
      ii. means for removably receiving a handle to facilitate replacement of the brush; and
   b. a support to which the brush holder is removably attached; and
in which the support comprises a pin and the brush holder further comprises (A) a groove into which the support is fitted and (B) a brush retainer configured to be lifted by the pin at certain times when the support is fitted into the groove.

3. A brush holder assembly according to claim 2 in which the support further comprises means for receiving at least one fastener.

4. A brush holder assembly comprising:
   a. a rotatable handle;
   b. a brush holder comprising:
      i. means for biasing a brush toward a rotating device; and
      ii. means for removably receiving the rotatable handle to facilitate replacement of the brush;
   c. a support to which the brush holder is removably attached; and
   d. a changing handle configured for attachment to the support.

* * * * *